US009503877B2

(12) United States Patent
Yang et al.

(10) Patent No.: US 9,503,877 B2
(45) Date of Patent: Nov. 22, 2016

(54) METHOD AND SYSTEM FOR RETRIEVING EXTERNAL IDENTIFIER OF TERMINAL

(71) Applicant: ZTE Corporation, Shenzhen, Guangdong (CN)

(72) Inventors: Kun Yang, Shenzhen (CN); Hao Wu, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 59 days.

(21) Appl. No.: 14/406,367

(22) PCT Filed: May 6, 2013

(86) PCT No.: PCT/CN2013/075210
§ 371 (c)(1),
(2) Date: Dec. 8, 2014

(87) PCT Pub. No.: WO2014/015698
PCT Pub. Date: Jan. 30, 2014

(65) Prior Publication Data
US 2015/0163655 A1 Jun. 11, 2015

(30) Foreign Application Priority Data
Jun. 13, 2012 (CN) .......................... 2012 1 0193950

(51) Int. Cl.
H04W 8/00 (2009.01)
H04W 8/26 (2009.01)
(Continued)

(52) U.S. Cl.
CPC .......... *H04W 8/005* (2013.01); *H04L 67/1063* (2013.01); *H04L 67/12* (2013.01); *H04W 4/005* (2013.01); *H04W 8/04* (2013.01); *H04W 8/26* (2013.01)

(58) Field of Classification Search
CPC ..................................................... H04W 12/06
See application file for complete search history.

(56) References Cited

U.S. PATENT DOCUMENTS

2003/0119481 A1* 6/2003 Haverinen ............ H04W 8/065
455/411
2011/0170517 A1* 7/2011 Bakker ............. H04W 36/0033
370/331

(Continued)

FOREIGN PATENT DOCUMENTS

CN 102238534 A 11/2011
CN 102833705 A 12/2012
WO 2012072142 A1 6/2012

OTHER PUBLICATIONS

Supplementary European Search Report in European application No. 13823763.1, mailed on Aug. 13, 2015.

(Continued)

*Primary Examiner* — Kouroush Mohebbi
(74) *Attorney, Agent, or Firm* — Oppedahl Patent Law Firm LLC

(57) ABSTRACT

Disclosed is a method for retrieving an EID of a terminal, which includes that a network side stores a corresponding relationship between an RN of the EID of the terminal and the EID of the terminal, and when the terminal responds to a trigger request from an MTC server, the network side retrieves the EID of the terminal which corresponds to the RN according to the RN of the EID of the terminal and the corresponding relationship. A system for retrieving the EID of the terminal is also disclosed. By employing the method and system, the network side can retrieve the EID of the terminal, and use a correct EID to respond to a terminal trigger request from an MTC server.

10 Claims, 5 Drawing Sheets

(51) Int. Cl.
*H04W 4/00* (2009.01)
*H04L 29/08* (2006.01)
*H04W 8/04* (2009.01)

(56) References Cited

U.S. PATENT DOCUMENTS

2013/0279458 A1 10/2013 Farkas
2013/0291071 A1* 10/2013 Blom .................... H04L 9/0833
726/4

OTHER PUBLICATIONS

3GPP TS 23.682 v11.0.0, mailed on Mar. 2012.
3GPP TR 23.888, mailed on Feb. 2012.
Translating external ID into internal ID, mailed on Nov. 7, 2011.
International Search Report in international application No. PCT/CN2013/075210, mailed on Aug. 15, 2013.
English Translation of the Written Opinion of the International Search Authority in international application No. PCT/CN2013/075210, mailed on Aug. 15, 2013.
Identifier Translation, Jul. 2011.

* cited by examiner

METHOD AND SYSTEM FOR RETRIEVING EXTERNAL IDENTIFIER OF TERMINAL

TECHNICAL FIELD

The disclosure relates to the field of mobile communications, and particularly relates to a method and a system for retrieving an External Identifier (EID) of a terminal.

BACKGROUND

FIG. 1 is a structural view of a mobile communications system in a related art. As shown in FIG. 1, the mobile communications system is mainly composed of a Core Network (CN), a Radio Access Network (RAN), and a terminal. The CN therein is in charge of a Non Access Stadium (NAS) affair, such as terminal location update and etc. and the CN is an anchor point at a user plane; the RAN includes a base station, and is mainly in charge of an access stadium affair, such as radio resource management. A physical or logical connection may exist between base stations according to an actual situation, such as the connection between base station 1 and base station 2, or between the base station 1 and base station 3, as shown in FIG. 1. Each base station may also be connected with one or more CN nodes in the CN. The terminal is User Equipment (UE), and the terminal may be any device which can communicate with the CN, such as a mobile phone, a tablet computer, a notebook computer, and etc.

Currently, following network elements are included in the CN:

A Mobility Management Entity (MME) or a Serving General Packet Radio Service Support Node (SGSN) is a unit which is for managing terminal access control, location information update and switch in the CN, and is for NAS signaling control from the CN to the terminal and for registering the terminal with the CN;

A Home Subscriber Server (HSS) or a Home Location Register (HLR) is an entity for preserving information in the CN, such as authorization information, authentication information, identity information, and subscription data of a user, and etc. According to different situations, the HSS or the HLR may be used to preserve the identity information of the user, and the binging information of the user and the terminal, or the HSS or the HLR may only preserve the identity information of the user while the binging information of the user and the terminal is preserved by a network manager, or the HSS or the HLR may directly preserve the identity information of the terminal. The HSS or the HLR is also for maintaining a subscription database of the user, and executing identity identification and authorization of the user and etc. A service platform make a query to the HSS or the HLR to obtain the identity information of the user or the identity information of the terminal.

A Packet Data Network-Gateway (P-GW) is located at a user side, and its main function is Internet Protocol (IP) address allocation, dialogue management, Policy and Charging Rules Function (PCRF) selection, route selection and data forwarding, Quality of Service (QoS) control, charging, policy and charging enforcement, and etc.

An Inter-Working Function (IWF) entity is a connection entity located between a mobile communications network and an external public network, and can implement functions such as protocol conversion, address inquiry, information preservation, and etc. The IWF may externally be connected with a Machine Type Communications (MTC) server, and may internally be connected with the HSS or the HLR, or a CN network element such as the MME or the SGSN, and etc.

An MTC Authentication Authorization Accounting (AAA) server, which belongs to a Home Public Land Mobile Network (HPLMN), provides a function of translation from an internal identifier of the terminal in the mobile communications network, such as an International Mobile Subscriber Identification Number (IMSI), to an external identifier at a network export. The MTC AAA server may be arranged to return the EID of the terminal according to the IMSI of the terminal, or may also be arranged as a Remote Authentication Dial In User Service (RADIUS) or a Diameter proxy server between the P-GW and an AAA server in an external Packet Data Network (PDN).

The EID of the terminal should be unique overall, and includes the following two parts:

1. A Domain Identifier (DID), which identifies a domain name controlled by an operator of one mobile communications network, wherein this domain name is for identifying an access address of a service provided by the operator, such as the service provided by the MTC-IWF, and the operator may use different DIDs to support different service accesses;

2. A Local Identifier (LID), which is managed by the operator of the mobile communications network, and is for exporting or obtaining the IMSI of the terminal; wherein the LID is unique in an application domain.

With regard to certain services, if a monitoring and management system needs to obtain monitoring data from the terminal, the terminal needs to be triggered through a server to establish a connection with the server, so as to report needed data to the server through the connection established with the server. After the terminal receives the trigger message from the server, the terminal needs to be able to respond immediately and establish the connection with the server. Currently, in order to meet a trigger requirement of the server to the terminal, the EID of the terminal is used to perform communications between the MTC server and the CN, and a corresponding relationship is stored between the IMSI and the EID of the terminal in the CN in an existing solution. However, the terminal only has one IMSI, but may have one or more EIDs, therefore, if the terminal has more EIDs, then the CN may obtain multiple EIDs according to the IMSI, as a result, which EID to be used cannot be determined, thus resulting in that the CN incorrectly responds to a terminal trigger request of the MTC server.

SUMMARY

In view of this, the embodiments of the disclosure provide a method and a system for retrieving the EID of a terminal. The network side can retrieve the EID of the terminal, and thus uses a correct EID to respond to a terminal trigger request from an MTC server.

The technical scheme of the disclosure is implemented as follows.

The disclosure provides a method for retrieving an EID of a terminal, including that:

storing, by a network side, a corresponding relationship between a Reference Number (RN) of an EID of a terminal and the EID of the terminal; and when a terminal responds to a trigger request from an MTC server, retrieving, by the network side, an EID of the terminal which corresponds to an RN according to the RN of the EID of the terminal and the corresponding relationship.

In the above method, the RN of the EID of the terminal is pre-configured at the network side, or dynamically allocated by a CN network element at the network side.

In the above method, storing, by the network side, the corresponding relationship between the RN of the EID of the terminal and the EID of the terminal is:

when the terminal accesses a network, an operator configures for the terminal the corresponding relationship between the RN of the EID of the terminal and the EID of the terminal, and stores the corresponding relationship into an HSS of the network side as subscription data of the terminal.

In the above method, when the terminal responds to the trigger request from the MTC server, the network side retrieving the EID of the terminal which corresponds to the RN according to the RN of the EID of the terminal and the corresponding relationship by the network side includes that:

a MTC-IWF reads out a received IMSI of the terminal and the RN of the EID of the terminal which are contained in a trigger message transmission report transmitted by a serving MME of the terminal, and looks up EIDs of the terminal corresponding to the read-out IMSI of the terminal in information of the terminal which is stored locally according to the read-out IMSI of the terminal, and retrieves the EID of the terminal corresponding to the read-out RN of the EID of the terminal from the found multiple EIDs of the terminal according to the read-out RN of the EID of the terminal; and the MTC-IWF transmits the trigger message transmission report containing the retrieved EID of the terminal to the MTC server.

In the above method, before the MTC-IWF reads out the received the IMSI of the terminal and the RN of the EID of the terminal which are contained in the trigger message transmission report transmitted by the serving MME of the terminal, this method further includes:

when the MTC server needs to obtain real time data from the terminal, the MTC server transmits a terminal trigger request message containing the EID of the terminal to the MTC-IWF;

the MTC-IWF makes a request to the HSS to obtain the information of the terminal, through a user information request message containing the EID of the terminal; the HSS looks up the corresponding information of the terminal which contains the IMSI of the terminal, a serving CN node identifier, and the RN of the EID of the terminal, in the subscription data of the terminal which is stored locally according to the EID of the terminal, and transmitting the corresponding information to the MTC-IWF;

the MTC-IWF stores the received information of the terminal, constructs a trigger message containing the IMSI of the terminal and the RN of the EID of the terminal, and transmits the trigger message to the serving MME of the terminal; wherein the serving MME of the terminal triggers the terminal to establish an NAS connection with the serving MME, and after the NAS connection is established, the serving MME encapsulates the trigger message containing the RN of the EID of the terminal into a NAS signaling, and transmits the NAS signaling to the terminal; or the serving MME directly encapsulates the trigger message containing the RN of the EID of the terminal into an NAS signaling, and transmitting the NAS signaling to the terminal;

the terminal transmits a trigger response message containing the RN of the EID of the terminal to the serving MME of the terminal; and the serving MME of the terminal transmits the trigger message transmission report containing the IMSI of the terminal and the RN of the EID of the terminal to the MTC-IWF.

In the above method, when the terminal responds to the trigger request from the MTC service, the network side retrieving the EID of the terminal corresponding to the RN according to the RN of the EID of the terminal and the corresponding relationship includes that:

an MTC AAA reads out the IMSI and the RN of the EID of the terminal in a received user identity request message, find multiple EIDs of the terminal from the information of the corresponding terminal which is stored locally according to read out IMSI of the terminal, and retrieves from the multiple EIDs of the terminal the EID of the terminal which corresponds to the read out RN of the EID of the terminal according to the read out RN of the EID of the terminal, and transmits the retrieved EID of the terminal to a serving P-GW through the user identity response message.

In the above method, before the MTC AAA reads out the IMSI and the RN of the EID of the terminal in the received user identity request message, this method further includes:

when the terminal is connected to the network, the network side establish a default PDN connection with the serving P-GW for the terminal, and registers the terminal with the MTC server;

when the MTC server needs to obtain the real time data from the terminal, the MTC server transmits the terminal trigger request message containing the EID of the terminal and registering information to the serving P-GW of the terminal;

the serving P-GW makes a request to the MTC AAA to obtain the information of the terminal through the user identity request message containing the EID of the terminal;

the MTC AAA looks up the corresponding information of the terminal in data stored locally according to the received EID of the terminal, and transmits the user identity request message to an HSS when the corresponding information of the terminal is not found; the HSS looks up the corresponding information of the terminal containing the IMSI of the terminal and the RN of the EID of the terminal which corresponds to the EID of the terminal, in the local subscription data of the terminal according to the EID of the terminal which is contained in the user identity request message, and returns the found corresponding information of the terminal to the MTC AAA through the user identity response message; the information of the terminal; the MTC AAA transmits the received user identity response message to the serving P-GW;

the serving P-GW stores the received information of the terminal, and transmits the trigger message containing the IMSI of the terminal and the RN of the EID of the terminal to the terminal through an Internet Protocol (IP) data package according to the registering information of the terminal through a default PDN connection;

the terminal reads out the trigger message contained in the IP data package, and transmits a PDN connection establishment request message containing the IMSI of the terminal and the RN of the EID of the terminal to the serving P-GW; and the serving P-GW makes a request to the MTC AAA to obtain the EID of the terminal through the user identity request message containing the IMSI of the terminal and the RN of the EID of the terminal.

In the above method, this method further includes:

after the serving P-GW receives the user identity response message, the serving P-GW uses the EID of the terminal which is contained in the received user identity response message to respond to a terminal trigger request from the MTC server, establishes a connection between the MTC server and the terminal corresponding to the EID of the terminal which is contained in the received user identity response message.

In the above method, storing by the network side the corresponding relationship between the RN of EID of the terminal and the EID of the terminal includes:

the MTC-IWF stores the information of the terminal which is contained in the user information response message transmitted by the HSS, allocates the RN of the EID of the terminal for the terminal, and stores the corresponding relationship between the RN of EID of the terminal and the EID of the terminal; and the MTC-IWF uses the IMSI contained in the user information response message and the RN of the EID of the terminal to construct a trigger message and transmits the trigger message to the serving MME of the terminal.

In the above method, retrieving, by the network side, the EID of the terminal which corresponds to the RN, according to the RN of the EID of the terminal and the corresponding relationship, when the terminal responses to the trigger request of the MTC server, includes that:

the MTC-IWF reads out the IMSI of the terminal and the RN of the EID of the terminal which are contained in the received trigger message transmission report transmitted by the serving MME of the terminal, looks up the EIDs of the terminal which correspond to the read-out IMSI of the terminal in the information of the terminal stored locally according to the read-out IMSI of the terminal, and retrieves the EID of the terminal which corresponds to the read out RN of the EID of the terminal, from the found multiple EIDs according to the read-out RN of the EID of the terminal; and the MTC-IWF transmits the trigger message transmission report containing the retrieved EID of the terminal to the MTC server.

In the above method, before the MTC-IWF stores the information of the terminal which is contained in the user information response message transmitted by the HSS, which method further includes:

when the MTC server needs to obtain the real time data from the terminal, the MTC server transmits the terminal trigger request message containing the EID of the terminal to the MTC-IWF;

the MTC-IWF makes a request to the HSS to obtain the information of the terminal through the user information request message containing the external identifier of the terminal; and the HSS looks up the corresponding information of terminal which contains the IMSI of the terminal and a serving CN node identity, in the subscription data of the terminal which is stored locally according to the EID of the terminal which is contained in the user information request message, and transmits the found information of the terminal to the MTC-IWF through the user information response message.

In the above method, before reading out, by the MTC-IWF, the IMSI of the terminal and the RN of the EID of the terminal which are contained in the received the trigger message transmission report transmitted by the serving MME of the terminal, this method further includes that:

the serving MME of the terminal triggers the terminal to establish an NAS connection with the serving MME, and encapsulates the trigger message containing the RN of the EID of the terminal into an NAS signaling and transmits the NAS signaling to the terminal after the NAS connection is established; or the serving MME directly encapsulates the trigger message containing the RN of the EID of the terminal into an NAS signaling, and transmits the NAS signaling to the terminal.

The terminal transmits the trigger response message containing the RN of the EID of the terminal to the serving MME of the terminal; and the serving MME of the server transmits the trigger message transmission report containing the IMSI of the terminal and the RN of the EID of the terminal to the MTC-IWF.

The disclosure also provides a system for retrieving an EID of a terminal, located at a network side, including a storage unit and a retrieving unit, wherein the storage unit is configured to store a corresponding relationship between an EID of a terminal and an RN of the EID of the terminal; and the retrieving unit is configured to, when a terminal responds to a trigger request from an MTC server, retrieve the EID of the terminal corresponding to the RN according to the RN of the EID of the terminal and the corresponding relationship stored in the storage unit.

In the above system, the RN of the EID of the terminal is pre-configured at the network side, or dynamically allocated by a CN network element at the network side.

In the method and the system for retrieving an EID of a terminal provided by the disclosure, a network side stores a corresponding relationship between an EID of a terminal and an RN of the EID of the terminal; when the terminal responds to a trigger request from an MTC server, the network side retrieves the EID of the terminal which corresponds to the RN according to the RN of the EID of the terminal and the corresponding relationship; in this way, the network side can retrieve the EID of the terminal according to the RN of the EID of the terminal, thus using a correct EID to respond to the terminal trigger request from the MTC server, which solves the problem that in the related art multiple EIDs may be obtained according to the IMSI, but which EID to be used cannot be determined, resulting in that the CN responds to the terminal trigger request from the MTC server incorrectly.

DETAILED DESCRIPTION

A basic idea of the disclosure is that a network side stores a corresponding relationship between the RN of the EID of a terminal and the EID of the terminal; when the terminal responds to a trigger request from an MTC server, the network side retrieves the EID of the terminal which corresponds to the RN according to the RN of the EID of the terminal and the corresponding relationship.

The disclosure is still further explained in detail through appended drawings and the specific embodiment below.

The disclosure provides a method for retrieving the EID of a terminal, and this method includes: a network side stores a corresponding relationship between the RN of the EID of the terminal and the EID of the terminal. When the terminal responds to the trigger request from an MTC server, the network side retrieves the EID of the terminal which corresponds to this RN according to the RN of the EID of the terminal.

The RN of the EID of the terminal therein may be pre-configured at the network side, or may be dynamically allocated by a RN network element at the network side.

Embodiment 1

Figure 1:
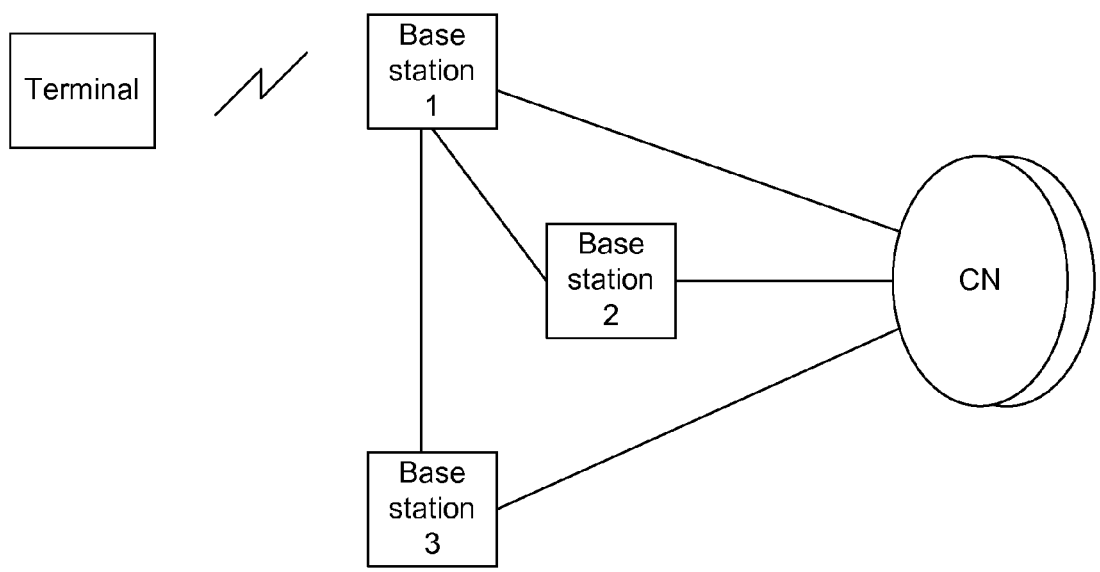
FIG. 1 is a structural view of a mobile communications system in a related art.
Figure 2:
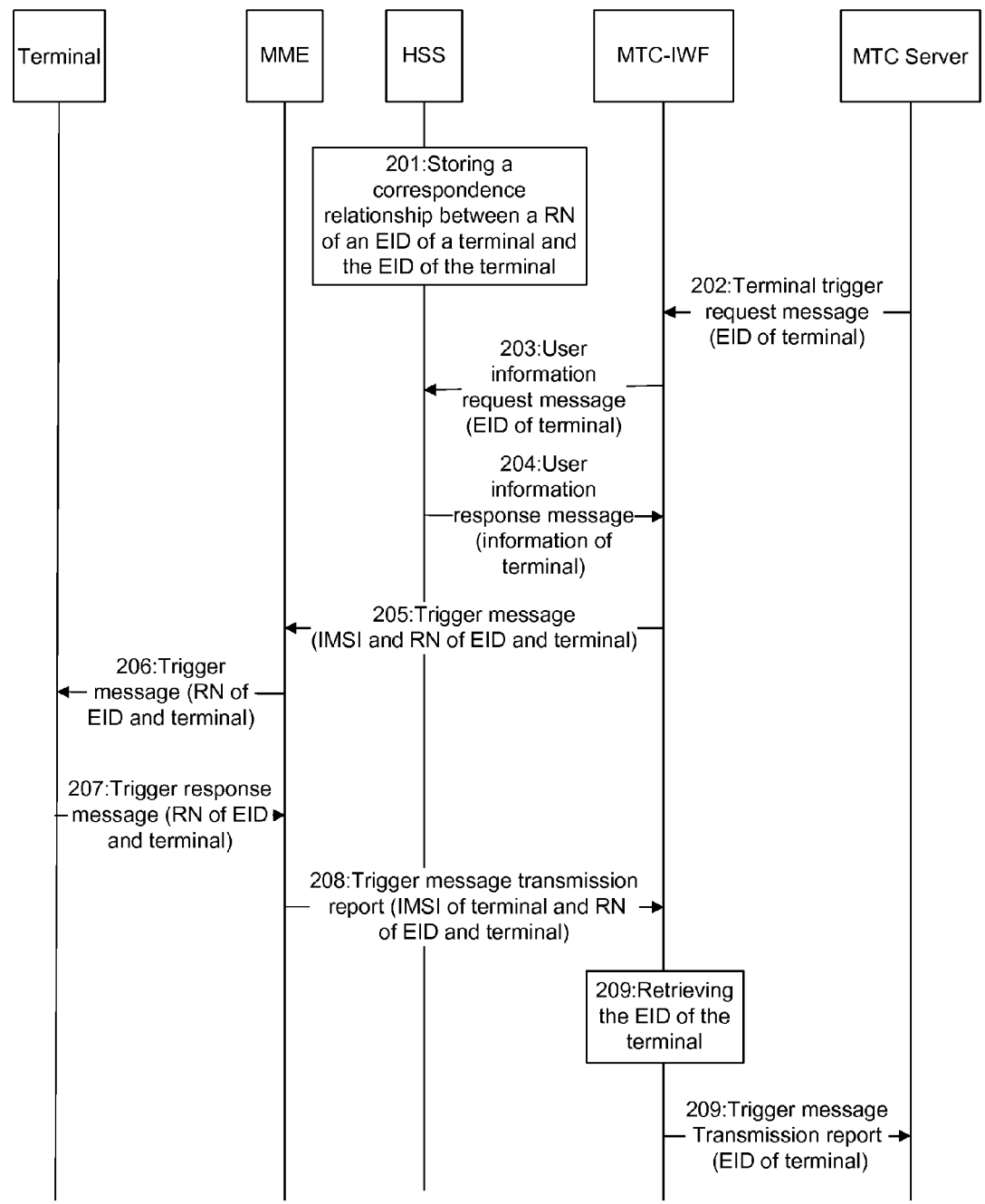
FIG. 2 is a flowchart of Embodiment 1 for implementing the method for retrieving the EID of a terminal according to the disclosure.

FIG. 2 is a flowchart of Embodiment 1 for implementing the method for retrieving the EID of a terminal according to the disclosure, which is applied in a scene that: the RN of the EID of a terminal is pre-configured by an operator in an HSS on a network side; when the terminal responds to the trigger request from an MTC server, the HSS searches for information of the terminal, and transmits the information of the terminal to an MTC-IWF; the MTC-IWF retrieves the corresponding EID of the terminal according to the information of the terminal and the RN of the EID of the terminal; as shown in FIG. 2, this method includes the following steps.

Step 201, An operator configures a corresponding relationship between the RN of the EID of a terminal and the EID of the terminal for the terminal, and stores the corresponding relationship in the HSS as subscription data of the terminal;

specifically, when the terminal accesses a network, the operator configures the corresponding relationship between the RN of the EID of the terminal and the EID of the terminal for the terminal, and stores the corresponding relationship in the HSS of the network side as the subscription data of the terminal; for example, an RN-EID relations table may be created in storage information of the HSS, the relations table is for indicating a one-to-one corresponding relationship between the RN of the EID of the terminal and the EID of the terminal; the RN-EID relations table may be shown in Table 1

TABLE 1

| RN-EID relations | |
|---|---|
| RN of EID of terminal | EID of terminal |
| RN#1 | EID#1 |
| RN#2 | EID#2 |
| ... | ... |
| RN#n | EID#n |

In this embodiment, the RN of the EID of the terminal is pre-configured by the operator, and may be a sequence number or may be the LID in the EID.

Step 202, When the MTC server needs to obtain real time data from the terminal, the MTC server a terminal trigger request message to the MTC-WIF; wherein the terminal trigger request message contains the EID of the terminal, the identifier of an application, and the address of the MTC server.

Step 203, After the MTC-IWF receives the terminal trigger request message from the MTC server, the MTC-IWF makes a request to the HSS for the information of the terminal through a user information request message, and the user information request message contains the EID of the terminal.

Step 204, The HSS looks up corresponding information of the terminal in subscription data of the terminal which are stored locally, according to the EID of the terminal contained in the user information request message, and transmits the information found to the MTC-IWF.

Specifically, after the HSS receives the user information request message form the MTC-IWF, the HSS looks up the corresponding information of the terminal in the subscription data which are stored locally according to the EID of the terminal contained in the user information request message; the information of the terminal includes the IMSI of the terminal, and a serving CN node identifier; since the HSS stores the corresponding relationship between the RN of the EID of the terminal and the EID of the terminal, the HSS can also find the RN of the EID of the terminal; the HSS transmits the found information of the terminal to the MTC-IWF through a user information response message; wherein the serving CN node may be the serving MME of the terminal.

Step 205, After the MTC-IWF receives the user information response message transmitted by the HSS, the MTC-IWF stores the information of the terminal contained in the user information response message, and create a trigger message using the IMSI and the RN of the EID of the terminal in the information of the terminal, and then transmits the trigger message to the serving MME of the terminal according to the serving CN node identifier of the terminal.

Step 206, After the serving MME receives the trigger message transmitted by the MTC-IWF, the serving MME makes a query to a local database according to the IMSI of the terminal in the trigger message to obtain the state of the terminal; if the terminal is in an idle state, then the serving MME transmits a paging message to the terminal, and after the terminal receives the paging message, the terminal transmits a service request signaling to the serving MME to request to establish an NAS connection with the serving MME; after the NAS connection is established, the serving MME encapsulates the trigger message containing the RN of the EID of the terminal into the NAS signaling, and transmits the NAS signaling to the terminal, namely the trigger message which is taken as one information element of the NAS signaling is transmitted to the terminal; if the terminal is in a connection state, then the serving MME directly encapsulates the trigger message containing the RN of the EID of the terminal into the NAS signaling and transmits the NAS signaling to the terminal, wherein the NAS signaling may be a Downlink NAS transport signaling; here, the trigger message, encapsulated in the NAS signaling by the serving MME, at least contains the RN of the EID of the terminal, and may also contain the identifier of the terminal, such as the IMSI, a Mobile Subscriber Identification Number (MSISDN), and etc.

Step 207, After the terminal receives the NAS signaling transmitted by the service MME, the terminal reads out the trigger message contained in the NAS signaling, and then transmits a trigger response message to the serving MME, wherein the trigger response message contains the RN of the EID of the terminal in the trigger message.

Step 208, After the serving MME receives the trigger response message from the terminal, the serving MME reads out the RN of the EID of the terminal contained in the trigger response message, and then transmits a trigger message transmission report to the MTC-IWF, the trigger message transmission report contains the IMSI of the terminal and the RN of the EID of the terminal.

Step 209, After the MTC-IWF receives the trigger message transmission report transmitted by the serving MME, the MTC-IWF read out the IMSI of the terminal and the RN of the EID of the terminal contained in the trigger message transmission report, looks up the EID of the terminal, which corresponds to the read-out IMSI of the terminal, in the information of the terminal which is stored locally in advance according to the read-out IMSI of the terminal, and then retrieves the EID of the terminal which corresponds to the read-out RN of the EID of the terminal from the found multiple EIDs of the terminal according to the read-out RN of the EID of the terminal; in this way, the MTC-IWF at the network side can determine a unique EID of the terminal according to the IMSI and the RN of the EID of the terminal; the MTC-IWF transmits the trigger message transmission report to the MTC service to notify the MTC service of successful transmission of the terminal trigger request message, wherein the trigger message transmission report contains the retrieved EID of the terminal.

Figure 3:
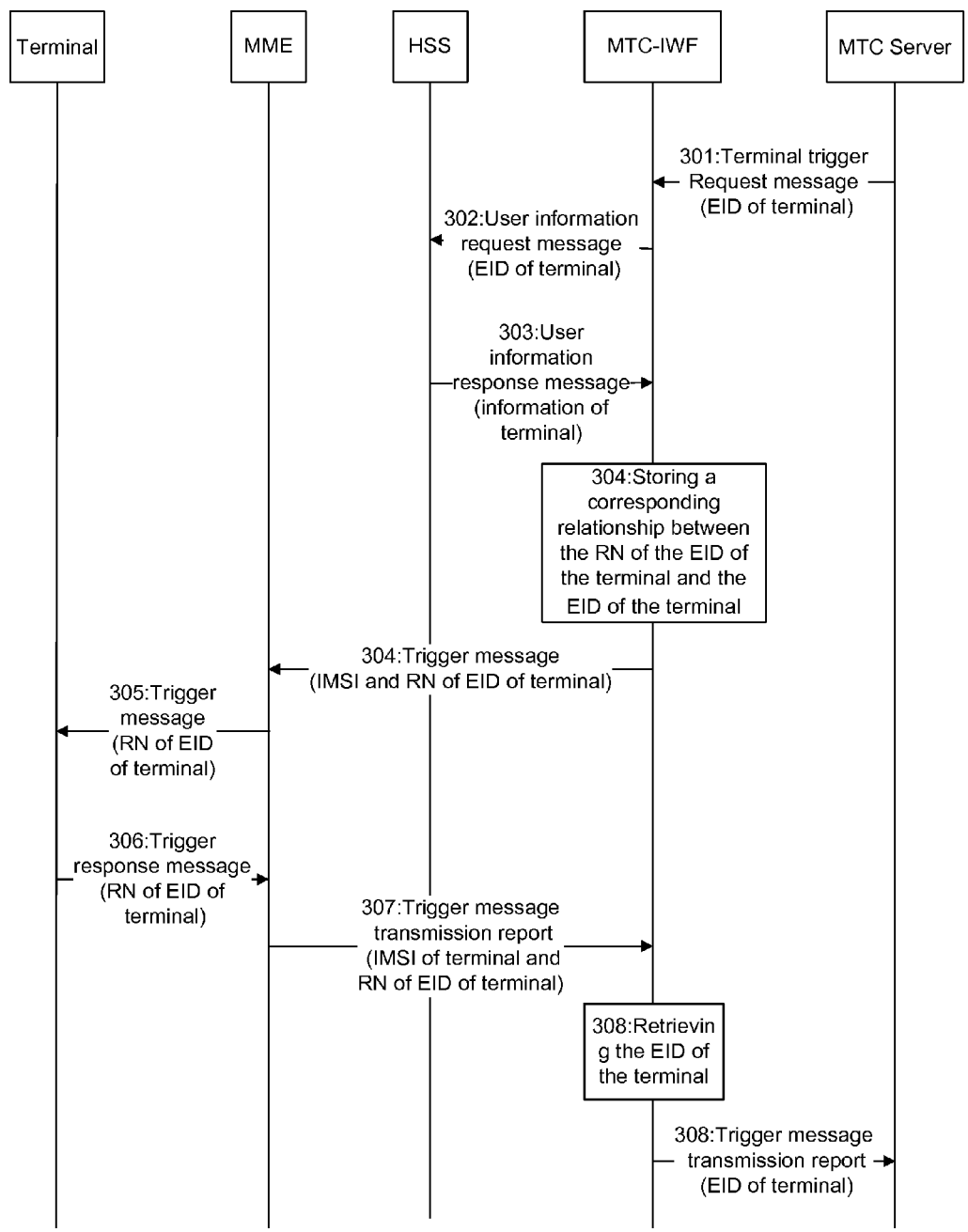
FIG. 3 is a flowchart of Embodiment 2 for implementing the method for retrieving the EID of a terminal according to the disclosure.

FIG. 3 is a flowchart of Embodiment 2 for implementing the method for retrieving the EID of the terminal according to the disclosure, which is applied in the scene that: a CN network element at a network side dynamically allocates the RN of the EID of a terminal; when the terminal responds to a trigger request from an MTC server, the CN network element retrieves a corresponding EID of the terminal according to the information of the terminal and the RN of the EID of the terminal; as shown in FIG. 3, this method includes the following steps.

Step 301, When the MTC server needs to obtain real time data from the terminal, the MTC server transmits a terminal trigger request message to the MTC-IWF, wherein the terminal trigger request message contains the EID of the terminal, the identifier of an application, and the address of the MTC server.

Step 302, After the MTC-IWF receives the terminal trigger request message from the MTC server, the MTC-IWF makes a request to the HSS for the information of the terminal through a user information request message, wherein the user information request message contains the EID of the terminal.

Step 303, After the HSS receives the user information request message from the MTC-IWF, the HSS looks up the corresponding information of the terminal in the subscription data of the terminal stored locally according to the EID of the terminal contained in the user information request message, and transmits the information found to the MTC-IWF.

Here, the information of the terminal includes the IMSI of the terminal, and the serving CN node identifier; the HSS transmits the found information of the terminal to the MTC-IWF through a user information response message; wherein the serving CN node may be the serving MME of the terminal.

Step 304, After the MTC-IWF receives the user information response message transmitted by the HSS, the MEC-IWF stores the information of the terminal contained in the user information response message, and allocates the RN of the EID of the terminal to the terminal.

Here, the RN of the EID of the terminal may be a sequence number dynamically allocated according to an activity of the terminal, or may employ the Local Identifier (LID) in the EID of the terminal.

After the RN of the EID of the terminal is allocated to the terminal, the MTC-IWF stores the corresponding relationship between the RN of the EID of the terminal and the EID of the terminal. For example, the MTC-IWF may create the RN-EID relations table in storage information of the MTC-IWF, wherein the relations table is for indicating the one-to-one corresponding relationship between the RN of the EID of the terminal and the EID of the terminal. The RN-EID relations table may be shown in Table 2:

TABLE 2

| RN-EID relations | |
| --- | --- |
| RN of EID of terminal | EID of terminal |
| RN#1 | EID#1 |
| RN#2 | EID#2 |
| ... | ... |
| RN#n | EID#n |

The MTC-IWF employs the IMSI contained in the received user information response message and the dynamic allocated RN of the EID of the terminal to construct a trigger message, and transmits this trigger message to the serving MME of the terminal according to the serving CN node identifier of the terminal.

Step 305, After the serving MME receives the trigger message transmitted by the MTC-IWF, the serving MME makes a query to a local database according to the IMSI of the terminal in the trigger message to obtain the state of the terminal; if the terminal is in an idle state, then the serving MME transmits a paging message to the terminal; after the terminal receives the paging message, the terminal transmits a service request signaling to the serving MME to request to establish an NAS connection with the serving MME; after the NAS connection is established, the serving MME encapsulates the trigger message containing the RN of the EID of the terminal into the NAS signaling, and transmits the NAS signaling to the terminal, namely, the trigger message is taken as one information element of the NAS signaling to be transmitted to the terminal; if the terminal is in a connection state, then the serving MME directly encapsulates the trigger message containing the RN of the EID of the terminal into the NAS signaling, and transmits the NAS signaling to the terminal, wherein the NAS signaling may be a Downlink NAS transport signaling; here, the trigger message, encapsulated in the NAS signaling by the serving MME, at least contains the RN of the EID of the terminal, or may also contain the identifier of the terminal, such as the IMSI, the MSISDN, and etc.

Step 306, After the terminal receives the NAS signaling transmitted by the serving MME, the terminal reads out the trigger message contained in the NAS signaling, and then transmits a trigger response message to the serving MME, wherein this trigger response message contains the RN of the EID of the terminal in the trigger message.

Step 307, After the serving MME receives the trigger response message from the terminal, the service MME reads out the RN of the EID of the terminal contained in the trigger response message, and then transmits a trigger message transmission report to the MTC-IWF, wherein the trigger message transmission report contains the IMSI of the terminal and the RN of the EID of the terminal.

Step 308, After the MTC-IWF receives the trigger message transmission report transmitted by the serving MME, the MTC-IWF reads out the IMSI of the terminal and the RN of the EID of the terminal which are contained in the trigger message transmission report, looks up the EID of the terminal, which corresponds to the read-out IMSI, in the information of the terminal pre-stored locally, according to the read-out IMSI of the terminal, and then retrieves the EID of the terminal, which corresponds to the read-out RN of the EID of the terminal, from found multiple EIDs of the terminal, according to the read-out RN of the EID of the terminal; in this way, the MTC-IWF at the network side may determine a unique EID of the terminal according to the IMSI and the RN of the EID of the terminal; the MTC-IWF transmits the trigger message transmission report to the MTC server, to notify the MTC server of successful transmission of the terminal trigger request message, wherein the trigger message transmission report contains the retrieved EID of the terminal.

Embodiment 3

Figure 4:
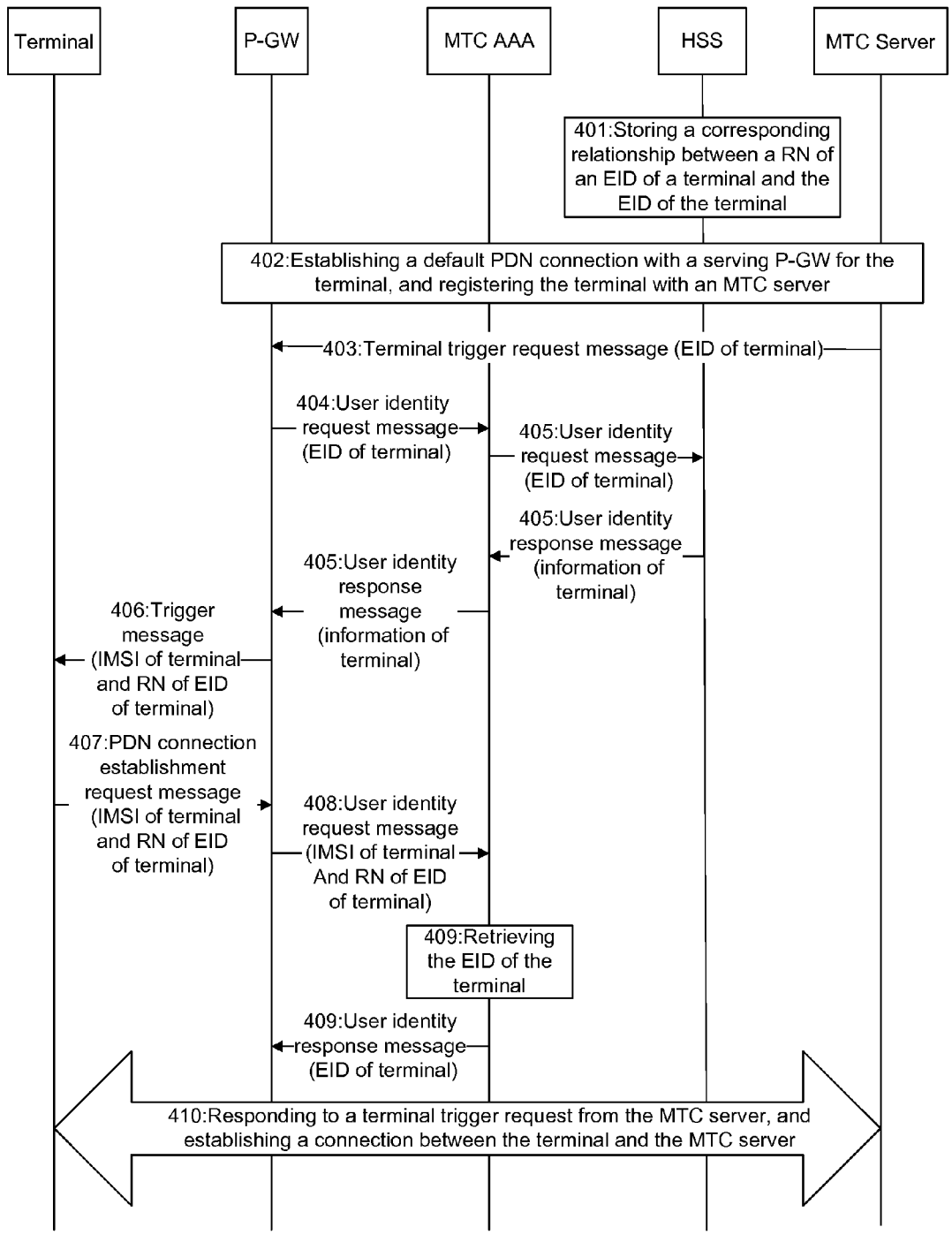
FIG. 4 is a flowchart of Embodiment 3 for implementing the method for retrieving the EID of a terminal according to the disclosure.

FIG. 4 is a flowchart of Embodiment 3 for implementing the method for retrieving the EID of the terminal according to the disclosure, which is applied in the scene that: an operator pre-configures the RN of the EID of a terminal in an HSS of a network side, and an MTC AAA obtains the information of the terminal from the HSS, and retrieves a corresponding EID of the terminal according to the obtained information of the terminal and the RN of the EID of the terminal; as shown in FIG. 4, this method includes the following steps.

Step 401, The operator configures a corresponding relationship between the RN of the EID of the terminal and the EID of the terminal for the terminal, and stores the corresponding relationship in the HSS as the subscription data of the terminal.

Specifically, when the terminal accesses a network, the operator configures a corresponding relationship between the RN of the EID of the terminal and the EID of the terminal for the terminal, and stores the corresponding relationship in the HSS of the network side as subscription data of the terminal; for example, a RN-EID relations table may be created in the storage information of the HSS, the relations table is for indicating the one-to-one corresponding relationship between the RN of the EID of the terminal and the EID of the terminal, the RN-EID relations table is shown in Table 3.

TABLE 3

RN-EID relations

| RN of EID of terminal | EID of terminal |
|---|---|
| RN#1 | EID#1 |
| RN#2 | EID#2 |
| ... | ... |
| RN#n | EID#n |

In this embodiment, the RN of the EID of the terminal, which may be the sequence number or may be the LID in the EID of the terminal, is pre-configured by the operator, Step 402, When the terminal boots up and is connected to the network, the network side establishes a default PDN connection with the serving P-GW for the terminal, to support an always online function; at the same time, the network side registers the terminal with the MTC server, the registering information including an IP address, a port and a protocol.

Step 403, When the MTC server needs to obtain real time data from the terminal, the MTC server transmits a terminal trigger request message to the serving P-GW of the terminal; wherein, the terminal trigger request message contains the EID of the terminal, registering information, the identifier of an application, and the address of the MTC server.

Step 404, After the P-GW receives the terminal trigger request message from the MTC server, the P-GW makes a request to the MTC AAA for the information of the terminal through a user identity request message, wherein the user identity request message contains the EID of the terminal.

Step 405, After the MTC AAA receives the user identity request message from the P-GW, the MTC AAA looks up the corresponding information of the terminal in the data stored locally according to the EID of the terminal contained in the user information request message; in this embodiment, the MTC AAA does not have the information of the corresponding terminal, therefore the MTC AAA needs to transmits the user identity request message to the HSS to request to obtain the information of the terminal from the HSS; the HSS searched the local subscription data of the terminal for the information of the corresponding terminal according to the EID of the terminal contained in the received user identity request message, and returns the found information of the terminal to the MTC AAA through a user identity response message; the information of the terminal includes the IMSI of the terminal and the RN of the EID of the terminal which corresponds to the EID of the terminal; the MTC AAA transmits the received user identity response message to the P-GW.

Step 406, After the P-GW receives the user identity response message, the P-GW stores the information of the terminal in the user identity response message, and uses the IMSI of the terminal and the RN of the EID of the terminal in the information of the terminal to construct a trigger message, and transmits the trigger message through an IP data package to the terminal through the default PDN connection and according to the registering information of the terminal.

Step 407, After the terminal receives the IP data package transmitted by the P-GW, the terminal reads out the trigger message contained in the IP data package, and transmits a PDN connection establishment request message to the P-GW; the PDN connection establishment request message contains the IMSI of the terminal and the RN of the EID of the terminal which are extracted from the trigger message.

Step 408, After the P-GW receives the PDN connection establishment request message from the terminal, the P-GW reads out the IMSI of the terminal and the RN of the EID of the terminal in the PDN connection establishment request message, and makes a request to the MTC AAA for the EID of the terminal through a user identity request message, wherein the user identity request message contains the IMSI of the terminal and the RN of the EID of the terminal.

Step 409, After the MTC AAA receives the user identity request message from the P-GW, the MTC AAA reads out the IMSI of the terminal and the RN of the EID of the terminal in the user identity request message, finds multiple EIDs of the terminal from the information of the corresponding terminal which is stored locally according to the read-out IMSI of the terminal, and then retrieves the EID of the terminal, which corresponds to the read-out RN of the EID of the terminal, from multiple EIDs of the terminal according to the read-out RN of the EID of the terminal, and finally transmits the retrieved EID of the terminal to the P-GW through a user identity response message.

Step 410, After the P-GW receives the user identity response message, the P-GW uses the EID of the terminal contained in the user identity response message to respond to the terminal trigger request from the MTC server, and establishes a connection between the MTC server and the terminal corresponding to the EID of the terminal.

Figure 5:
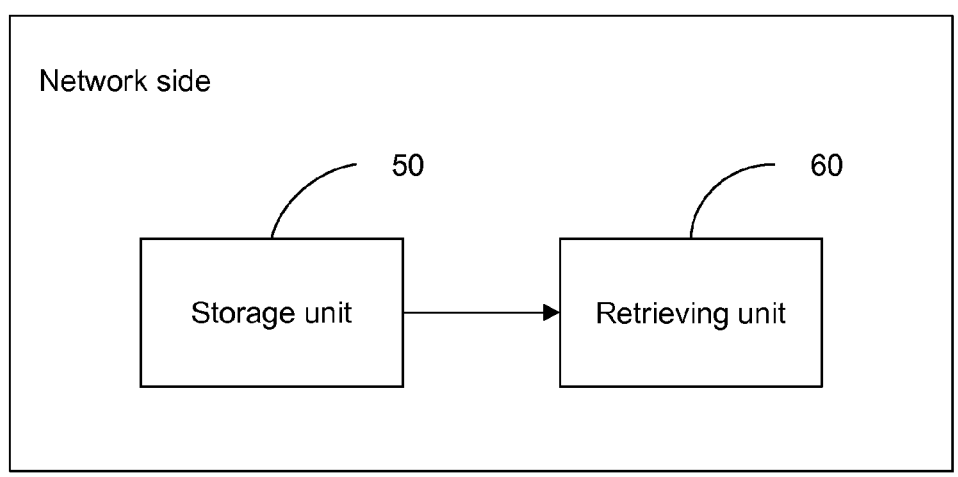
FIG. 5 is a structural view for implementing a system for retrieving the EID of a terminal according to the disclosure.

In order to complement the above method, the disclosure also provides a system for retrieving the EID of a terminal. FIG. 5 is a structural view for implementing the system for retrieving the EID of a terminal according to the disclosure.

As shown in FIG. 5, this system is located at a network side, and this system includes a storage unit 50 and a retrieving unit 60, wherein the retrieving unit 50 is configured to store a corresponding relationship between the RN of the EID of a terminal and the EID of the terminal; and the retrieving unit 60, is configured to, when the terminal responds to a trigger request from an MTC server, retrieve the EID of the terminal which corresponds to the RN, according to the RN of the EID of the terminal and the corresponding relationship stored in the storage unit 50.

The RN of the EID of the terminal therein is pre-configured at the network side, or is dynamically allocated by a CN network element at the network side.

All those described above are only preferred embodiments of the disclosure, and are not used to limit protection scope of the disclosure. Any modification, alternation and improvement made within a spirit and a principle of the disclosure should be contained in the protection scope of the disclosure.

What is claimed is:

1. A method for retrieving an External Identifier (EID) of a terminal, comprising:
   storing, by a network side, a corresponding relationship between an EID of a terminal and a Reference Number (RN) of the EID of the terminal; and
   when a terminal responds to a trigger request from a Machine Type Communications (MTC) server, retrieving, by the network side, an EID of the terminal which corresponds to an RN according to the RN of the EID of the terminal and the corresponding relationship;
   wherein the RN of the EID of the terminal is pre-configured at the network side, or dynamically allocated by a Core Network (CN) network element at the network side;
   wherein storing, by the network side, the corresponding relationship between an EID of a terminal and an RN of the EID of the terminal is: when a terminal accesses a network, configuring, for the terminal by an operator, a corresponding relationship between an EID of the terminal and an RN of the EID of the terminal, and storing the corresponding relationship into a Home Subscriber Server (HSS) of the network side as subscription data of the terminal;
   wherein when the terminal responds to the trigger request from the MTC server, retrieving, by the network side, the EID of the terminal which corresponds to the RN, according to the RN of the EID of the terminal and the corresponding relationship is:
   receiving and reading out, by a Machine Type Communications Inter-Working Function (MTC-IWF), an International Mobile Subscriber Identification Number (IMSI) of the terminal and the RN of the EID of the terminal which are contained in a trigger message transmission report transmitted by a serving Mobility Management Entity (MME) of the terminal, and looking up EIDs of the terminal corresponding to the read-out IMSI of the terminal in information of the terminal which is stored locally according to the read-out IMSI of the terminal, and retrieving the EID of the terminal corresponding to the read-out RN of the EID of the terminal from the found EIDs of the terminal according to the read-out RN of the EID of the terminal; and
   transmitting, by the MTC-IWF, the trigger message transmission report containing the retrieved EID of the terminal to the MTC server.

2. The method according to claim 1, before the MTC-IWF receives and reads out the IMSI of the terminal and the RN of the EID of the terminal which are contained in the trigger message transmission report transmitted by the serving MME of the terminal, the method further comprising:
   when the MTC server needs to obtain real time data from the terminal, transmitting, by the MTC server, a terminal trigger request message containing the EID of the terminal to the MTC-IWF;
   making a request, by the MTC-IWF, to the HSS to obtain the information of the terminal through a user information request message containing the EID of the terminal; looking up, by the HSS, the information of the terminal which comprises the IMSI of the terminal, a serving CN node identifier, and the RN of the EID of the terminal, in the subscription data of the terminal which is stored locally according to the EID of the terminal, and transmitting the information of the terminal to the MTC-IWF;
   storing, by the MTC-IWF, the information of the terminal, constructing a trigger message containing the IMSI of the terminal and the RN of the EID of the terminal, and transmitting the trigger message to the serving MME of the terminal;
   triggering, by the serving MME of the terminal, the terminal to establish a Non Access Stadium (NAS) connection with the serving MME of the terminal, and after the NAS connection is established, encapsulating the trigger message containing the RN of the EID of the terminal into a NAS signaling, and transmitting the NAS signaling to the terminal; or directly encapsulating, by the serving MME of the terminal, the trigger message containing the RN of the EID of the terminal into the NAS signaling, and transmitting the NAS signaling to the terminal;
   transmitting, by the terminal, a trigger response message containing the RN of the EID of the terminal to the serving MME of the terminal; and
   transmitting, by the serving MME of the terminal, the trigger message transmission report containing the IMSI of the terminal and the RN of the EID of the terminal to the MTC-IWF.

3. The method according to claim 1, wherein when the terminal responds to the trigger request from the MTC service, retrieving, by the network side, the EID of the terminal corresponding to the RN according to the RN of the EID of the terminal and the corresponding relationship is:
   reading out, by an MTC Authentication Authorization Accounting (AAA), the IMSI and the RN of the EID of the terminal in a user identity request message received, finding EIDs of the terminal from the information of the terminal which is stored locally, according to read-out IMSI of the terminal; retrieving the EID of the terminal which corresponds to the read-out RN of the EID of the terminal, from the EIDs of the terminal, according to the read-out RN of the EID of the terminal; transmitting the retrieved EID of the terminal to a serving Packet Data Network-Gateway (P-GW) through a user identity response message.

4. The method according to claim 3, before reading out, by the MTC AAA, the IMSI and the RN of the EID of the terminal in the received user identity request message, the method further comprising:
   when the terminal is connected to the network, establishing, by the network side, a default Packet Data Network (PDN) connection with the serving P-GW for the terminal, and registering the terminal with the MTC server;

when the MTC server needs to obtain real time data from the terminal, transmitting a terminal trigger request message containing the EID of the terminal and registering information to the serving P-GW;

requesting, by the serving P-GW, the information of the terminal to the MTC AAA, through the user identity request message containing the EID of the terminal;

looking up, by the MTC AAA, the information of the terminal in data stored locally according to the EID of the terminal received, and transmitting the user identity request message to the HSS when the information of the terminal is not searched; finding, by the HSS, the information of the terminal containing the IMSI of the terminal and the RN of the EID of the terminal which corresponds to the EID of the terminal, from the local subscription data of the terminal according to the EID of the terminal which is contained in the user identity request message, and returning the found information of the terminal to the MTC AAA through the user identity response message; transmitting, by the MTC AAA, the user identity response message to the serving P-GW;

storing, by the serving P-GW, the information of the terminal, and transmitting the trigger message containing the IMSI of the terminal and the RN of the EID of the terminal to the terminal through an Internet Protocol (IP) data package, according to the registering information of the terminal and through the default PDN connection;

reading out, by the terminal, the trigger message contained in the IP data package, and transmitting a PDN connection establishment request message containing the IMSI of the terminal and the RN of the EID of the terminal to the serving P-GW; and making a request, by the serving P-GW, to the MTC AAA to obtain the EID of the terminal through the user identity request message containing the IMSI of the terminal and the RN of the EID of the terminal.

5. The method according to claim 3, further comprising:
after the serving P-GW receives the user identity response message, responding to, by the serving P-GW, the trigger request from the MTC server using the EID of the terminal which is contained in the user identity response message received, and establishing a connection between the MTC server and the terminal corresponding to the EID of the terminal which is contained in the user identity response message.

6. A method for retrieving an External Identifier (EID) of a terminal, comprising:
storing, by a network side, a corresponding relationship between an EID of a terminal and a Reference Number (RN) of the EID of the terminal; and when a terminal responds to a trigger request from a Machine Type Communications (MTC) server, retrieving, by the network side, an EID of the terminal which corresponds to an RN according to the RN of the EID of the terminal and the corresponding relationship;

wherein the RN of the EID of the terminal is preconfigured at the network side, or dynamically allocated by a Core Network (CN) network element at the network side;

wherein storing by the network side, the corresponding relationship between an EID of a terminal and an RN of the EID of the terminal is:

storing, by a Machine Type Communications Inter-Working Function (MTC-IWF), information of the terminal which is contained in a user information response message transmitted by a Home Subscriber Server (HSS), allocating the RN of the EID of the terminal for the terminal, and storing the corresponding relationship between the RN of EID of the terminal and the EID of the terminal; and using, by the MTC-IWF, an International Mobile Subscriber Identification Number (IMSI) contained in the user information response message and the RN of the EID of the terminal allocated, to create a trigger message and transmitting the trigger message to a serving Mobility Management Entity (MME) of the terminal.

7. The method according to claim 6, wherein retrieving, by the network side, the EID of the terminal which corresponds to the RN according to the RN of the EID of the terminal and the corresponding relationship when the terminal responds to the trigger request from the MTC server, is:

reading out, by the MTC-IWF, the IMSI of the terminal and the RN of the EID of the terminal which are contained in a trigger message transmission report transmitted by the serving MME of the terminal, looking up EIDs of the terminal which correspond to the read-out IMSI of the terminal in the information of the terminal stored locally according to the read-out IMSI of the terminal, and retrieving the EID of the terminal which corresponds to the read-out RN of the EID of the terminal from the found EIDs, according to the read-out RN of the EID of the terminal; and transmitting, by the MTC-IWF, the trigger message transmission report containing the retrieved EID of the terminal, to the MTC server.

8. The method according to claim 7, before the MTC-IWF stores the information of the terminal which is contained in the user information response message transmitted by the HSS, the method further comprising:

when the MTC server needs to obtain real time data from the terminal, transmitting, by the MTC server, a terminal trigger request message containing the EID of the terminal to the MTC-IWF;

making a request, by the MTC-IWF, to the HSS to obtain the information of the terminal through a user information request message containing the EID of the terminal; and looking up, by the HSS, the information of terminal which contains the IMSI of the terminal and a serving CN node identifier, in subscription data of the terminal which is stored locally, according to the EID of the terminal which is contained in the user information request message, and transmitting the information of the terminal found to the MTC-IWF through the user information response message.

9. The method according to claim 7, before reading out, by the MTC-IWF, the IMSI of the terminal and the RN of the EID of the terminal which are contained in the trigger message transmission report transmitted by the serving MME of the terminal, the method further comprising:

trigger, by the serving MME of the terminal, the terminal to establish an Non Access Stadium (NAS) connection with the serving MME of the terminal, and after the NAS connection is established, encapsulating the trigger message containing the RN of the EID of the terminal into an NAS signaling and transmitting the NAS signaling to the terminal; or directly encapsulating, by the serving MME of the terminal, the trigger message containing the RN of the EID of the terminal into an NAS signaling, and transmitting the NAS signaling to the terminal;

transmitting, by the terminal, a trigger response message containing the RN of the EID of the terminal to the serving MME of the terminal; and transmitting, by the serving MME of the terminal, the trigger message transmission report containing the IMSI of the terminal and the RN of the EID of the terminal to the MTC-IWF.

10. A system for retrieving an External Identifier (EID) of a terminal, located at a network side, comprising a processor configured to be capable of executing programmed instructions comprising:

storing a corresponding relationship between an EID of a terminal and a Reference Number (RN) of the EID of the terminal; and when a terminal responds to a trigger request from a Machine Type Communication (MTC) server, retrieving an EID of the terminal corresponding to an RN according to the RN of the EID of the terminal and the corresponding relationship stored in the storage unit;

wherein the RN of the EID of the terminal is pre-configured at the network side, or dynamically allocated by a Core Network (CN) network element at the network side;

wherein storing, by the network side, the corresponding relationship between an EID of a terminal and an RN of the EID of the terminal is: when a terminal accesses a network, configuring, for the terminal by an operator, a corresponding relationship between an EID of the terminal and an RN of the EID of the terminal, and storing the corresponding relationship into a Home Subscriber Server (HSS) of the network side as subscription data of the terminal;

wherein when the terminal responds to the trigger request from the MTC server, retrieving, by the network side, the EID of the terminal which corresponds to the RN, according to the RN of the EID of the terminal and the corresponding relationship is:

receiving and reading out, by a Machine Type Communications Inter-Working Function (MTC-IWF), an International Mobile Subscriber Identification Number (IMSI) of the terminal and the RN of the EID of the terminal which are contained in a trigger message transmission report transmitted by a serving Mobility Management Entity (MME) of the terminal, and looking up EIDs of the terminal corresponding to the read-out IMSI of the terminal in information of the terminal which is stored locally according to the read-out IMSI of the terminal, and retrieving the EID of the terminal corresponding to the read-out RN of the EID of the terminal from the found EIDs of the terminal according to the read-out RN of the EID of the terminal; and transmitting, by the MTC-IWF, the trigger message transmission report containing the retrieved EID of the terminal to the MTC server.

* * * * *